United States Patent [19]

Freck et al.

[11] 3,900,573

[45] Aug. 19, 1975

[54] PROCESS FOR MAKING RETORT STABLE SIMULATED MEAT PRODUCTS

[75] Inventors: James A. Freck, Park Forest South; Dale H. O'Rell; Leonard V. Kondrot, both of Chicago, all of Ill.

[73] Assignee: American Maize Products Company, New York, N.Y.

[22] Filed: Feb. 19, 1974

[21] Appl. No.: 443,438

[52] U.S. Cl. .................. 426/274; 426/574; 426/802
[51] Int. Cl. .............................................. A23j 3/00
[58] Field of Search .......... 426/89, 92, 93, 104, 274, 426/212, 350, 364, 802, 167

[56] References Cited

UNITED STATES PATENTS 3,163,541 12/1964 Mainhardt et al. .................. 426/274
3,686,002 8/1972 Nakano et al. ...................... 426/274

Primary Examiner—James R. Hoffman
Attorney, Agent, or Firm—Eyre, Mann & Lucas

[57] ABSTRACT

An improved process for preparing simulated meat products is disclosed. The improvement comprises the inclusion in the product of an inhibited starch material whereby the appearance and texture of the product is not altered by retort sterilization.

8 Claims, No Drawings

PROCESS FOR MAKING RETORT STABLE SIMULATED MEAT PRODUCTS

The present invention relates to a new and useful process for the preparation of simulated meat products especially those formed from vegetable or animal proteins.

Simulated meat products from animal and vegetable proteins have been prepared in the past. One method used commercially is to spin protein fibers from alkaline dispersions from soy proteins and then further process the spun fibers with binders and flavors subsequent to which a further heat treatment is applied. A second process which has been used is to prepare a mixture of soy protein with binders and flavors and form the mixture to shape by extrusion or compaction. The former process is expensive because of the considerable number of manufacturing steps required. The latter process is expensive because of the machinery required for the extrusion or compaction.

In a co-pending application Ser. No. 255,054 filed June 6, 1972 there is disclosed a comparatively inexpensive process for the production of simulated meat and cheese products. In that process, a high amylose material is blended with an animal or vegetable protein. The high amylose material acts as a binder in the product. With the high amylose material, manufacturing costs are substantially reduced. It is not necessary to perform a number of manufacturing steps as was described hereinbefore with respect to other prior art processes nor is it necessary to use expensive extrusion or compacting apparatuses. This invention is said to be of great advantage in today's food markets where the price of meats and cheeses is out of the reach of many people and substitute high protein products are highly desirable.

While the thus described process is of very substantial benefit it has been found that one of the disadvantages of the resulting products is that they are not stable under normal retort conditions. When the protein products with high amylose material are subjected to retorting, the high amylose material (whether natural amylose or modified) leaches from the textured pieces and retrogrades in solution to form a gel or thick layer on the outside of the textured pieces. Thus, the product of the prior invention is not suitable for canning (where retorting is essential) since the retorted canned products will have an unappetizing appearance and mouth feel.

In accordance with the present invention it has been discovered that if certain inhibited (cross-linked) starches are used as the binding agent for the protein material, they will not leach out when subjected to retorting but rather will give a good simulated meat or cheese type product having good appearance and mouth feel. It should be pointed out that ordinary unmodified starches are not suitable for the binding agent in simulated meat and cheese type products since, if they are used in sufficient quantity to bind the protein material they will give a taffy-like consistency whereas if the amount of starch is reduced to get away from the taffy-like consistency the binding effect of the starch is insufficient to form a good product.

The inhibited starches which are useful in the present invention are those from dent corn, waxy corn, sorghum, wheat and tapioca. The degree to which they are inhibited is important and is defined in terms of the Granular Swelling Power (GSP) of the starch. The following table indicates the maximum and minimum GSP at 95°C. for each starch to be effective in accordance with the present invention:

Table

| Starch | Minimum GSP at 95°C. | Maximum GSP at 95°C. |
|---|---|---|
| Corn | 5 | 15 |
| Waxy Corn | 5 | 25 |
| Sorghum | 5 | 15 |
| Wheat | 5 | 15 |
| Tapioca | 5 | 25 |

The GSP of a starch is defined as the volume occupied by a standard amount of swollen hydrated starch granules. This method is described for example in Schoch, Methods in Carbohydrate Chemistry, Vol. IV, Starch, published by Academic Press in 1964.

The method of inhibiting the starch is not particularly critical, so long as the necessary GSP is accomplished. For example, waxy or dent corn starch can be treated with 0.02–0.2% phosphorus oxychloride or 0.05–0.4% epichlorohydrin to inhibit the starch to a degree sufficient to fall within the GSP range of the table. Other suitable inhibiting agents include sodium trimetaphosphate, vinyl acetate, adipic anhydride, acrolein, or combinations of the foregoing. After the starch has been inhibited it may be further treated as for example by esterification or etherification if desired so long as the additional treatment does not take the starch out of the GSP value as set forth in the foregoing table.

The product of the present invention may be used as veterinary feeds for dogs, cats and the like. It will, therefore, be understood that the terms "food product" and "food substitute" as used in the present specification and claims include food products for both human and veterinary use.

Protein materials useful in the present invention include vegetable and animal proteins and proteins of microbiological origin. In general, the protein material should have a proteinaceous content of at least 15% and preferably at least 20%. Best results are obtained when the protein material has a proteinaceous content of above 50%, dry basis. Suitable vegetable proteins include corn gluten, cottonseed, peanut and soy. With soy, the protein material can either be a soy flour, a soy concentrate or a soy protein isolate, the latter being highly desirable since it has a proteinaceous content of about 95%. Suitable animal proteins include blood, casein, gelatin, collagen, fish meal, and comminuted poultry, pork and beef products. It has also been found that cottage cheese acid whey can be used as the protein material preferably in combination with one or more other protein materials. Cottage cheese acid whey is at present a largely unused by-product and the present invention affords an avenue for its use.

For purposes of the present invention, the protein materials useful in the invention are referred to as "a plurality of pieces of edible protein material." It will be understood that this phrase includes not only the comminuted proteinaceous materials such as comminuted beef and poultry but also includes powders such as casein, suspensions such as soy concentrates and liquids such as blood.

As previously mentioned, the products produced by the process of the present invention are retort stable. By this it is meant that the products will withstand normal sterilization temperatures for normal continuous and retort processing. Typical retort temperatures are from about 240° to about 270°F. at gauge pressures from about 10 psi to about 30 psi and for times of from about 12 minutes to about 180 to 295 minutes.

In accordance with the present invention the inhibited starch material and the protein material are admixed in aqueous solution and the blend is heated at a temperature at least about 20°F. higher than the gelatinization temperature of the inhibited starch material. The inhibited starch material is preferably present in an amount of from about 10 to about 1,000% by weight of protein material and best results are obtained when the inhibited starch material is present in the amount of from about 20 to about 500% by weight of protein material. Additional ingredients such as plasticizers, humectants, food colorings, amino acids, gums, flavorings and the like may be added if desired. Suitable plasticizers include lecithins, sorbitol, mannitol, polyglocols, glycerol, propylene glycol, monoglycerides, and blends of mono- and diglycerides. Suitable humectants include sorbitol, glycerine, polyglycols, corn syrups, corn syrup solids and maltodextrins. Flavorings which may be included are the usual flavoring agents including salt, pepper, herbs, spices, sugar, smoke, vitamins, amino acids, polypeptides, partly hydrolyzed proteins and the like.

In the preferred process of the present invention the admixture of protein material and inhibited starch material is heated in a suitable steam injected jet cooker (for example the Schutte Koerting Steam Injection Jet) at relatively high temperatures for a short period of time. The temperature and period of time should be sufficient to gelatinize a substantial portion of the inhibited starch material but yet it should not be so long that it will cause an appreciable loss in nutritional value of the protein nor should the protein have appreciable decomposition or degradation. It will be understood that it is not necessary to use a jet cooker and that any cooking system can be used which will achieve the desired result of gelatinizing the inhibited starch material without appreciably decreasing the nutritional value and/or appreciably decomposing or degrading the protein material. Other suitable equipment useful in the process include swept surface heat exchangers and pressure cookers.

The blend of inhibited starch material and protein material is suitably cooked at a temperature of from about 240° to about 450°F. for a period of from about 1 to about 3 seconds. The cooked material may then be discharged into ambient conditions or cooled air, or it may be discharged into a cooling bath, preferably aqueous. The temperature of the aqueous cooling bath is suitably from about 32° to about 100°F. The consistency of the heated product discharged from the apparatus varies from a thick paste to a firmly textured curd or gelled product depending upon total solids, ratio of protein to starch and nature of the protein. The product will set either under ambient conditions or in the cold water bath to a gelled product and the consistency of the gelled product will depend upon the nature of the product discharged from the jet cooker. Products made with the range of inhibited starch material as stated in the present invention usually have good texture, good slicing characteristics, and good feel, especially a mouth feel simulating hamburger. The products are integral and may be breaded, deep-fat fried, etc., and may be incorporated in and/or with other proteinaceous materials for the manufacture of edible products such as meat patties, meat loaves, semi-moist foods, meat pastes and flavors. Furthermore, the products are retort stable and are thus suitable for canning. More specifically, on retorting, the products remain textured and there is no visible separation of starch binder in the textured pieces nor is there a gel in the covering liquid.

The shape of the gelled product will depend upon the shape of the orifice in the jet cooker and also will vary depending upon whether the cooked product is quenched to atmosphere or immersed in an aqueous bath.

Gelled products have been made in the form of pieces curds, films, ropes, filaments and formed products.

These and other features of the present invention are demonstrated in the Examples which follow:

AUTOCLAVE TEST

In order to demonstrate the retort stability of products made in accordance with the present invention, each of the products was subjected to a rigid autoclaving test. We have found that a product which will pass an autoclave test is retort stable. This test comprised placing the product loosely in a 307×409 (No. 2) can and covering the product in one instance with water and in a second instance with a starch gravy. Each of the cans was then sealed and autoclaved at a temperature of 248°F. for one hour at 15 psi gauge pressure. Thereafter, the cans were cooled in water and were subsequently examined after a lapse of 24–48 hours. The product was said to pass the autoclave test and be retort stable only if all cans met all of the following criteria:

a. There was no visible evidence of starch separation.
b. There was no gel on top of the product.
c. Textured pieces retained their texture.

EXAMPLE 1

Corn starch was inhibited by cross-linking it with 0.1% phosphorus oxychloride in the presence of sodium hydroxide and sodium chloride. The resulting product had a GSP at 95°C. of between 5 and 25. Four pounds of this inhibited starch was combined with 12 pounds of Promine R and 32 pounds of water to form a slurry. Promine R is an acid precipitated soy protein isolate available from Central Soya. The slurry was jet cooked at 250°F. and the hot material, as it exited from the cooker, went directly into a cold water quench. The product formed resembled coarsely crumbled hamburger and had good texture and mouth feel. The product was subjected to the autoclave test and was found to be retort stable by the autoclave test.

EXAMPLE 2

Example 1 is repeated except that the jet cooker temperature is 350°F. Comparable results are obtained.

EXAMPLE 3

Examples 1 and 2 are repeated except that the jet cooked material is discharged into a large tub where it is stirred and tossed into the air to effect an air quenched cooling. Comparable results are obtained.

EXAMPLE 4

Example 1 is repeated except that inhibited wheat starch with a GSP at 95°C. of 5–15 is substituted for the inhibited corn starch. The wheat starch is inhibited by treating it with 0.1% phosphorus oxychloride in the presence of sodium hydroxide and sodium chloride. Comparable results are obtained.

EXAMPLE 5

When example 1 is repeated with inhibited waxy corn starch having a GSP value at 95°C. of 5–25 or with sorghum starch having a GSP value at 95°C. of 5–15 or with inhibited tapioca starch having a GSP value at 95°C. of 5–25, comparable results are obtained.

EXAMPLE 6

Example 1 is repeated except that the corn starch is cross-linked with 0.3% epichlorohydrin instead of 0.1% phosphorus oxychloride in the presence of sodium hydroxide and sodium chloride. Comparable results are obtained.

EXAMPLE 7

Example 1 is repeated except that waxy corn starch is used in place of the dent corn starch. The waxy corn starch is cross-linked with 0.2% phosphorus oxychloride. The product obtained resembles loose hamburger and is retort stable by the autoclave test.

EXAMPLE 8

Example 7 is repeated except that the inhibition of the waxy corn starch is by 0.3% phosphorus oxychloride in one test and by 0.4% phosphorus oxychloride in a second test. The products obtained still resemble loose hamburger but are found to be firmer as the percentage of inhibiting agent increases. The products are still found to be retort stable by the autoclave test.

EXAMPLE 9

Corn starch was inhibited by cross-linking it with 0.3% epichlorohydrin in the presence of sodium hydroxide. The resulting product had a GSP value at 95°C. of between 5–25. Seven and one-half pounds of this inhibited starch was combined with 12 pounds of Promine R, 2 pounds of fat, 2 pounds of maltodextrin, 30 pounds of liquid egg whites and 5.3 pounds of water to form a slurry. The liquid egg whites had a protein content of approximately 11% and constituted approximately 21% total protein content of the slurry. The fat was emulsified in the slurry. Thereafter, the slurry was jet cooked at 260°F. The hot material, as it was discharged from the jet cooker, was directed into a large tub under agitation to effect air quenching of the material. The product obtained was textured resembling loose hamburger. The product passed the autoclave test and was thus found to be retort stable.

EXAMPLE 10

Example 9 was repeated in a number of different tests in which the jet cooking temperature was varied. The different temperatures used for the jet cooker were 270°, 280°, 290°, 300°, 310°, 320°, 330°, and 340°. In each case, comparable results were obtained.

EXAMPLE 11

Ten and one-half pounds of Melosoy soy flour (a soy flour of approximately 55% protein and available from Swift) was admixed with 3.5 pounds of corn starch (which had been cross-linked with 0.3% epichlorohydrin) and 23 pounds of water to form a slurry. The slurry was jet cooked at 310°F. whereafter it was air quenched. Textured curds having a crumbly-like mouth feel texture were obtained. This material was found to be retort stable by the autoclave test.

EXAMPLE 12

Example 11 was repeated except that the jet cooking temperature was 350°F. Comparable results were obtained.

EXAMPLE 13

Example 11 was repeated except that the jet cooked slurry was water quenched rather than air quenched. In this case the pieces obtained were slightly softer and had a slightly gummy adhesive surface. The product was still retort stable when tested by the autoclave test.

EXAMPLE 14

Example 13 was repeated except that the jet cooking temperature was 350°F. Comparable results were obtained.

EXAMPLE 15

When examples 11–14 were repeated using Staley extracted soy flour, comparable results were in each case obtained. The Staley soy flour has a protein content of approximately 50%.

EXAMPLE 16

Examples 11–15 were repeated except that 42 grams of CMC Hercules Gum No. 7HOF (a carboxymethyl cellulose gum) was added to the slurry. The resulting products were comparable to those obtained in examples 11–14 except that the products were considerably firmer in texture and cohered to a greater degree. The products were tested by the autoclave method and were found to be retort stable.

EXAMPLE 17

Example 16 was repeated except that CMC Hercules Gum No. 7LF was substituted for the CMC Hercules Gum No. 7HOF. Comparable results were obtained.

EXAMPLE 18

Example 11 was repeated except that 45 grams of calcium chloride was added to the slurry in order to introduce calcium into the finished product for increased food value purposes. The resulting product was quite comparable and was found to be retort stable since it passed the autoclave test.

EXAMPLE 19

Meat patties were prepared from the product of example 18 in the following manner:

517 grams of the product of example 18 was admixed with 345 grams of ground beef having a 30% fat content, 8 grams of dextrose, 16 grams of corn oil and a small amount of seasoning. Patties were formed from the admixture and were then fried in standard manner. The fried patties retained their shape, were easy to handle and were found to have a pleasant taste, good aroma and good texture. The finished product was very similar to a standard hamburger pattie.

EXAMPLE 20

Corn starch was inhibited with 0.3% epichlorohydrin. Eight pounds of the inhibited starch was combined with 12 pounds of Promine R, 5 pounds of beef fat, 4 pounds of maltodextrin and 32 pounds of water to form an emulsion. 200 grams of caramel color (No. 50 Sethness) and 2 ounces of commercial blend of whole crushed herbs and spices (sold under the brand name of Dell'Alp and distributed by Rubinilli, Inc., of Cicero, Ill.) were added to the emulsion. The resulting emulsion was then jet cooked at 340°–350°F. whereafter the jet cooked product was air quenched. The product formed resembled coarsely ground cooked hamburger and had a pleasant pork sausage odor and taste. The product was found to be especially suitable for the preparation of Sloppy Joes and it was found that 100% of the ground meat ordinarily used in Sloppy Joes could be substituted by the product of this example and the resulting Sloppy Joe mixture still had virtually the same flavor and texture as Sloppy Joes with 100% ground meat.

The product was found to be retort stable since it passed the autoclave test.

It will be understood that the claims are intended to cover all changes and modifications of the preferred embodiments of the invention, herein chosen for the purpose of illustration, which do not constitute departures from the spirit and scope of the invention.

What is claimed is:

1. A process for preparing a retort stable food product comprising:
    a. admixing in aqueous solution a blend comprising a plurality of pieces of edible protein material having a protein content of at least about 15% and from about 10 to about 1,000% by weight of protein material of an inhibited starch material selected from the group consisting of corn starch having a Granular Swelling Power at 95°C. of from about 5 to about 15, waxy corn starch having a Granular Swelling Power at 95°C. of from about 5 to about 25, sorghum starch having a Granular Swelling Power at 95°C. of from about 5 to about 15, wheat starch having a Granular Swelling Power at 95°C. of from about 5 to about 15, and tapioca starch having a Granular Swelling Power at 95°C. of from about 5 to about 25;
    b. cooking the blend at a temperature and for a period of time sufficient to gelatinize a substantial portion of the inhibited starch material without appreciable loss in nutritional value of the protein and without appreciable decomposition or degradation of the protein; and
    c. cooling the cooked product;
    d. whereby a retort stable integral product comprising the piece of protein material bound together with inhibited starch material is obtained.

2. The process of claim 1 wherein the blend is cooked in a jet cooker at a temperature of from about 240° to about 450°F. for a period of from about 1 to about 3 seconds.

3. The process of claim 1 wherein the blend additionally comprises plasticizers, humectants and flavorings.

4. The process of claim 1 wherein the cooling is done in an aqueous medium.

5. The process of claim 1 wherein the inhibited starch material is present in the amount of from about 20 to about 500% by weight of protein material.

6. The process of claim 1 wherein the inhibited starch material is corn starch inhibited by treatment with from about 0.02 to about 0.2% phosphorus oxychloride.

7. The process of claim 1 wherein the inhibited starch material is corn starch inhibited by treatment with from about 0.05 to about 0.4% epichlorohydrin.

8. A food product prepared by the process of claim 1.

* * * * *